United States Patent [19]

Hansen

[11] Patent Number: 4,595,925
[45] Date of Patent: Jun. 17, 1986

[54] ALTITUDE DETERMINING RADAR USING MULTIPATH DISCRIMINATION

[75] Inventor: James P. Hansen, Fairfax, Va.

[73] Assignee: The United States of America as represented by the Secretary of the Navy, Washington, D.C.

[21] Appl. No.: 479,583

[22] Filed: Mar. 28, 1983

[51] Int. Cl.⁴ .............................................. G01S 13/08
[52] U.S. Cl. .................................. 343/13 R; 343/12 A
[58] Field of Search .................. 343/462, 13 R, 12 A, 343/15, 458, 17.1 R, 5 MM, 458, 17.1 PW, 12 R

[56] References Cited

U.S. PATENT DOCUMENTS

| | | | |
|---|---|---|---|
| 2,837,738 | 6/1958 | Van Valkenburgh | 343/12 R |
| 3,014,215 | 12/1961 | Macdonald | 343/13 R |
| 3,714,654 | 1/1973 | Wicks et al. | 343/17.1 PW X |
| 4,090,197 | 5/1978 | Cantrell | 343/16 M |
| 4,370,656 | 1/1983 | Frazier et al. | 343/458 |
| 4,386,355 | 5/1983 | Drew et al. | 343/5 MM X |

Primary Examiner—Thomas H. Tarcza
Assistant Examiner—Mark Hellner
Attorney, Agent, or Firm—Robert F. Beers; Sol Sheinbein; Charles S. Guenzer

[57] ABSTRACT

A height-determining radar utilizing both direct and multipath signals comprising a radar transmitter and receiver and means for measuring the variation of the pulse widths of the received radar signal, the variation being caused by fluctuating multipath contribution to the received signal, and further comprising means for calculating the target height h from the equation $h = cR\tau_B/4e$, where c is the speed of light, R is the target range, $\tau_B$ is the pulse width variation and e is the radar height. The multipath variation may be enhanced by varying the linear polarization of the emitted radar signal.

10 Claims, 6 Drawing Figures

ALTITUDE DETERMINING RADAR USING MULTIPATH DISCRIMINATION

BACKGROUND

1. Field of the Invention

The invention relates generally to radar and in particular to a height determining radar.

2. Description of the Prior Art

Radars are most typically used for determining the range of the target from the radar set. If the radar emits a narrow beam, the beam can be scanned in the azimuthal angle, i.e. around the vertical axis, to determine the azimuth of the target. By the same principle, if the beam width is narrow in both the azimuthal and polar directions, then the radar can be scanned in two dimensions to provide a determination of both the azimuth and elevation of the target. Such radars have been implemented to determine the height of radar targets. However the very narrow beam required for good resolution of altitude at long ranges necessitates antennas excessively large for mobile radars. Furthermore each sector of the two-dimensional scan must be individually probed thus increasing the time required for a complete scan in a search radar. Because aircraft radars and to lesser extent shipboard radars are not fixed in relation to the horizon, a determination of polar angle does not provide a direct determination of target elevation.

SUMMARY OF THE INVENTION

It is therefore an object of the invention to provide a height-determining radar.

It is a further object of this invention to provide a height- determining radar that can use a wide radar beam.

It is yet a further object of this invention to provide a height-determining radar that is accurate and easy to implement.

The invention is a height-determining radar that detects both the direct radar return from a target and multipath radar returns that reflect not only from the target but also from an intermediate reflecting surface such as the sea. The radar pulse width is chosen to be longer than the multipath delay. The intensity of the multipath signal tends to vary from pulse to pulse. If the direct and the multipath signals overlap and are of the same magnitude, as they often are, the multipath signal produces a variation of the apparent pulse width of the combined signal. The pulse width variation equals the multipath delay that can be used to calculate the target altitude if the target range and radar altitude are determined by other means.

The pulse width variation can be enhanced by varying from pulse to pulse the linear polarization of the emitted radar signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
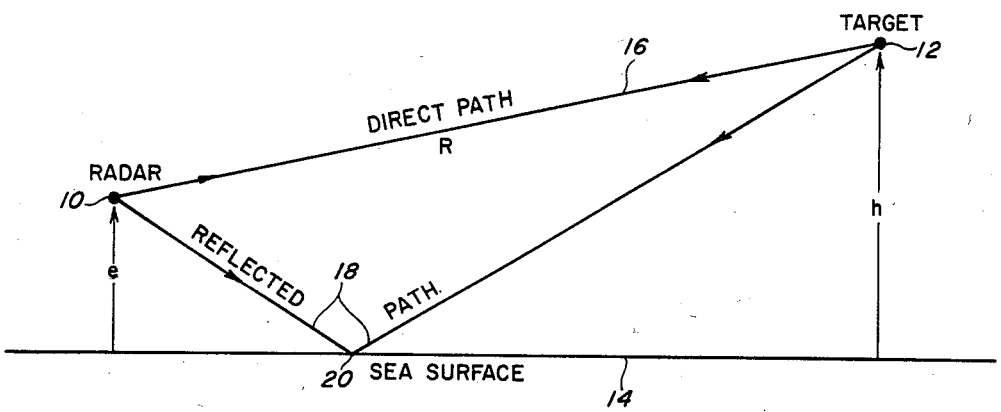
FIG. 1 is a schematic representation of multipath radar propagation.

Referring now to the drawings, wherein like reference numerals designate identical or corresponding parts throughout the several views, and more particularly to FIG. 1 thereof, multipath signals arise when the radar 10 and the aircraft target 12 are operating over a reflecting surface 14 such as the sea. The normal radar signal follows a direct path 16 to and from the target 12. The direct pathlength will be the range R. However the range R is more precisely the slant range rather than the ground separation. Because the sea surface 14 is reflecting, the radar signal can follow a reflected path 18 that includes a reflection from a point 20 on the sea surface. The reflected path 18 is longer than the direct path 16 by a differential pathlength which is given approximately by the expression $$\Delta = 2eh/R \tag{1}$$

where e is the altitude of the emitting radar 10 and h is the altitude of the target 12. The altitudes e and h are measured from the surface 20 which is assumed to be level.

The radar 10 will receive radar echoes from the target 12 that propagate either along the direct path 16 or the reflected path 18. The time differential or multipath delay will be related to the difference in total pathlength by the speed of light c. If the emitted signal travels from the radar along the direct path 16 but is reflected back from the target 12 along the reflected path 18, the one reflection multipath delay is $\tau_1 = \Delta/c$. Alternatively if the emitted signal travels along the reflected path 18 but is reflected back along the direct path 16, the time differential is again $\tau_1$. However, if both the emitted signal and the target-reflected signal travel along the reflected path 18, then the two reflection multipath delay is doubled, $\tau_2 = 2\tau_1$ which will be called the multipath delay $\tau_B$ where $$\tau_B = 2\Delta/c \tag{2}$$

Thus the target altitude can be derived from the multipath delay $\tau_B$ by the relation $$h = Rc\tau_B/4e. \tag{3}$$

The other variables e and R can easily be measured by other means. The radar altitude e can be determined by a radar altimeter or if the radar platform is fixed its altitude can be measured by physical means. The target range R can be determined by a radar using the same radar pulse returns as the height-determining radar. Equation (1) is based upon an approximation so that other forms for Eqn. (3) are possible. Furthermore, if the radar transmitter and radar receiver are not co-located or if a more complete scattering theory is employed, more complex relationships than Eqn. (3) will be obtained.

Figure 2:
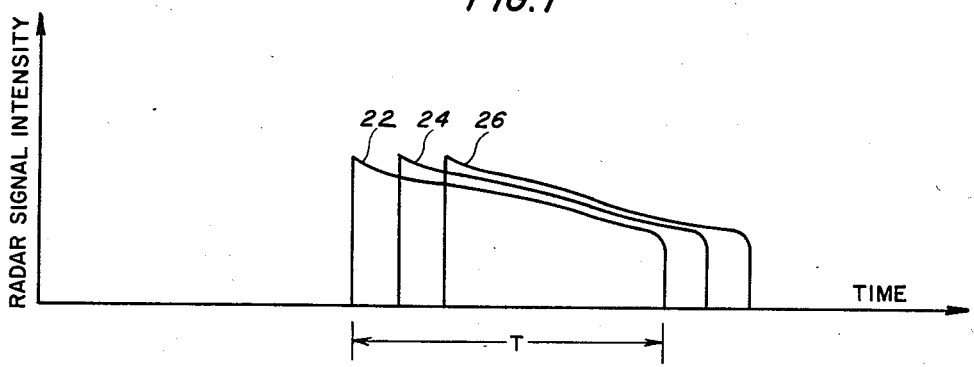
FIG. 2 is a graphical representation of the radar signals resulting from various propagation paths in terms of intensity as a function of time.

In FIG. 2 is shown the radar returns from a target 12 as would be observed on a typical A-scope for each of the paths. The direct signal 22 is the first to be detected and has a pulse width T of the same duration as the emitted pulse. The once reflected signal 24 is delayed by a time $\tau_B/2$ and results from signals travelling along the refected path 18 of FIG. 1 on transmission as reflection but along the direct path 16 in the other direction. The twice reflected signal 26 results from both the radar transmission and reflection path following the reflected path 18. The signals 22, 24 and 26 are shown as equal-amplitude signals although the relative amplitudes in fact may be different. However, it has been experimentally observed that the signals 22, 24 and 26 have roughly the same magnitude.

Figure 3:
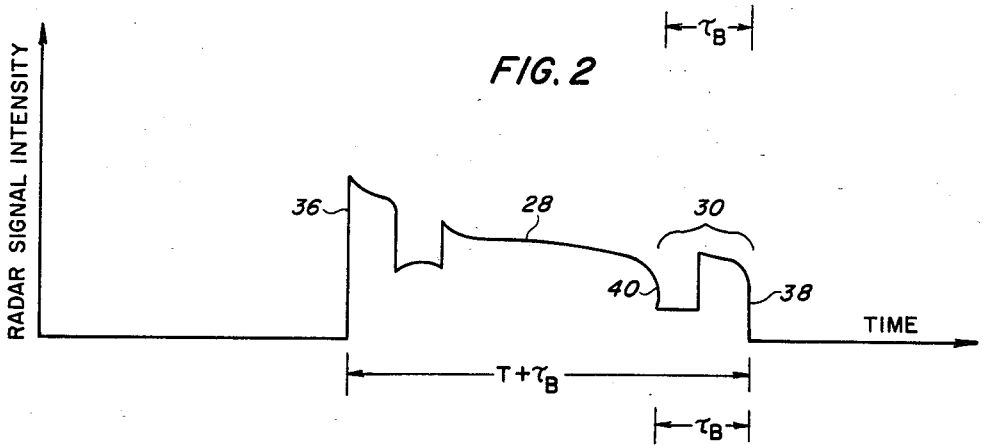
FIG. 3 is a graphical representation of the radar signal resulting from combining the direct and multipath signals.

If the multipath delays $\tau_B/2$ and $\tau_B$ are shorter than the pulse width T, then the direct signal 22 and the reflected signals 24 and 26 will not appear as individual pulses, as shown in FIG. 2, but will add to a combined signal 28 as shown in FIG. 3. The combined signal 28 is not an algebraic sum of the separate signals 22, 24 and 26 of FIG. 2 because these signals are coherent with each other. The radar detects the magnitude of the sum of the RF signals rather than a sum of the magnitudes of RF signals. In other words, the signals 22, 24 and 26 may combine either constructively or destructively.

If the signals 22, 24 and 26 do temporally overlap, the presence of the delayed signals 24 and 26 will be evidenced as shown in FIG. 3 as random apparent increases of the pulse width of the combined signals 28 from T to T+$\tau_B$. Attempts to determine the actual value of the multipath delay via straight forward range resolution of the direct and delayed signals have proven to be extremely difficult due to the high radar resolutions required and to the comparatively large range extent of actual targets.

Experimental evidence indicates that, for broadband transmission, the backscatter and therefore the fore-ward-scatter characteristics of the sea surface are very dynamic as a function of sea state and polarization of the RF signals. Furthermore M. I. Skolnik in *Introduction to Radar Systems*, 2nd ed. has pointed out that reflectivity is strongly dependent upon the linear polarization of the radar signal for small grazing angles. Multipath from most radars involve such small grazing angles. For these and other reasons, the reflected signals 24 and 26 tend to greatly vary in magnitude and phase from pulse to pulse with the result that the solely multipath portion 30 of the signals of duration $\tau_B$ will tend to oscillate from pulse to pulse. This variation or oscillation can be enhanced by intentionally varying the linear polarization of the emitted radar signal. The greatest difference will be obtained by varying the emitted signals between the orthogonal modes of vertical and horizontal polarization.

The effect of the magnitude variation of the solely multipath signal 30 is to produce a series of radar signals the apparent pulse widths of which are varying between T and T+$\tau_B$. The pulse width variation $\tau_B$ is the multipath delay which can be related to the target altitude h by Eqn. (3) assuming that the target range R and radar altitude e are known.

The pulse-to-pulse variation of the combined reflection signal 28 will be manifested most vividly in the solely multipath signal 30 which for some pulses will almost disappear. For a combined signal 28 with a large solely multipath signal 30, the received pulse width will be measured from its first leading edge 36 to the last trailing edge 38 and will be T+$\tau_B$. However, for some pulses, the solely multipath signal 30 will be insignificant due to polarization changes or temporal variations of the sea surface and the received pulse width will be measured from the first trailing edge 36 to the direct signal falling edge 40 and will be T.

Figure 4:
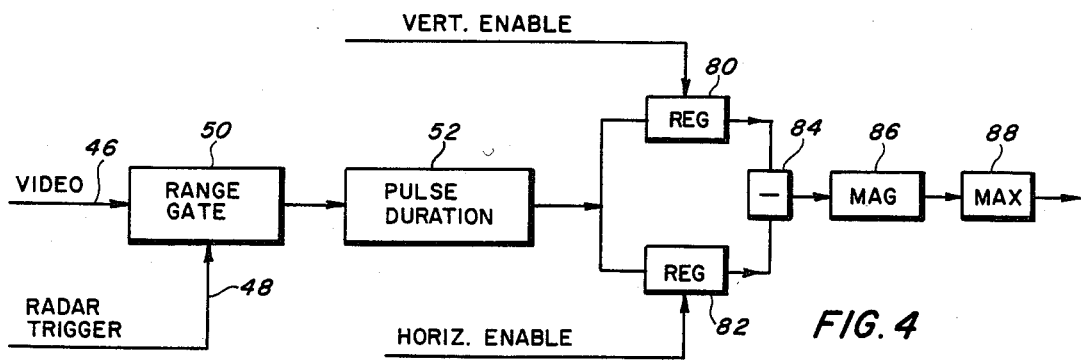
FIG. 4 is a schematic representation of one embodiment of a height-determining radar built according to the invention.

One embodiment of a circuit that detects the variation of pulse width is shown in schematic representation in FIG. 4. The radar receiver produces a video detection signal on line 46 corresponding to the signals of FIGS. 2 and 3 which is led into a range gate circuit 50. The range gate circuit 50 is an analog switch which opens for a detection period that begins a fixed period after a trigger pulse is received from the radar on line 48. The range gate circuit 50 acts to eliminate high intensity returns from near targets and to shrink the data stream to a region of high interest, i.e. to where the target is predicted to be located.

The output of the range gate circuit 50 is a gated target video signal which is fed into an edge-triggered pulse duration circuit 52 that measures the duration of a pulse measured from the first rising edge to the last falling edge. The edge-triggered pulse duration circuit 52 can be implemented according to the block diagram of FIG. 5. The video signal is fed into a differentiator 60 such as an RC circuit which converts a signal having a series of steps into a series of positive and negative pulses. The positive pulse correspond to rising edges of the signal and the negative pulses to falling edges. The radar trigger on line 48 is delayed for a time $T_1$, generally corresponding to the beginning of the range gate, by a delay circuit 64 from which the $T_1$-delayed signal is fed into the first input of a flip/flop 62. The flip/flop 62 produces one positive pulse when first its first input 63 and then its second input 65 receive positive pulses. The differentiated video signal from the differentiator 60 is fed into the second input 65 of the flip/flop 62. The one-pulse output of the flip/flop 62 occurs at the first rising edge within the range gate and it is used to initiate or restart a running clock 66. The clock 66 is read by a first register 68 when the first register 68 is enabled by a negative pulse from the differentiator 60 that is inverted by an inverter 69. Thus the first register 68 contains the time that has elapsed between the first rising edge and the last falling edge observed to that time. The first register 68 is read by a second register 70 when that register is positively enabled by the $T_1$-delayed radar trigger further delayed by $T_2$ in a delay circuit 72. The delay $T_2$ would generally define the length of the range gate. The second register 70 contains the duration as measured by the clock 66 between the first rising edge and the last falling edge of the video signal occurring during the range gate.

Referring again to FIG. 4, the digital output of the edge-triggered pulse duration circuit 52 is fed into one of two parallel registers 80 and 82. In the embodiment where the emitted radiation of the radar is alternated between vertical and horizontal polarization, one register 80 is enabled by a vertically polarized pulse and the other register 82 by a horizonally polarized pulse. The outputs of the two registers 80 and 82 are compared in a subtractor 84 and the magnitude of the difference is taken in a magnitude circuit 86. The output of the magnitude circuit 86 is the measured multipath delay $\tau_B$.

The range R is known from other parts of the radar. The altitude of the radar is presumed known either from an independent measurement using an altimeter or for a constant-altitude radar relying on a predetermined altitude. Then the target altitude h can be calculated using Eqn.(3) and the output of the magnitude circuit 86.

Because the multipath delayed signal is uncertain in a marine environment, there is no guarantee that differently polarized pulses will produce differing return signals with differing pulse widths. This uncertainty is decreased by feeding the output of the magnitude circuit 86 into a maximizing circuit 88 which retains the largest output of the magnitude circuit 86. Alternatively the two registers 80 and 82 can be replaced by a memory bank which is filled with the pulse durations of numerous pulses. The largest magnitude of difference between vertically and horizontally polarized pulses will be the multipath delay $\tau_B$. If no alternating polarization is imposed on the emitted radiation, then all pulses are compared to determine the maximum difference.

Obviously the memory and differencing circuitry can be implemented in a software controlled computer.

Figure 5:
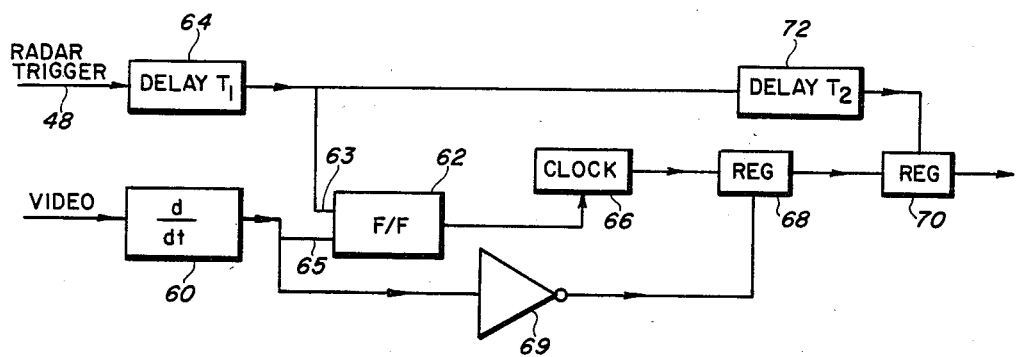
FIG. 5 is a schematic representation of an edge-triggered pulse duration circuit.
Figure 6:
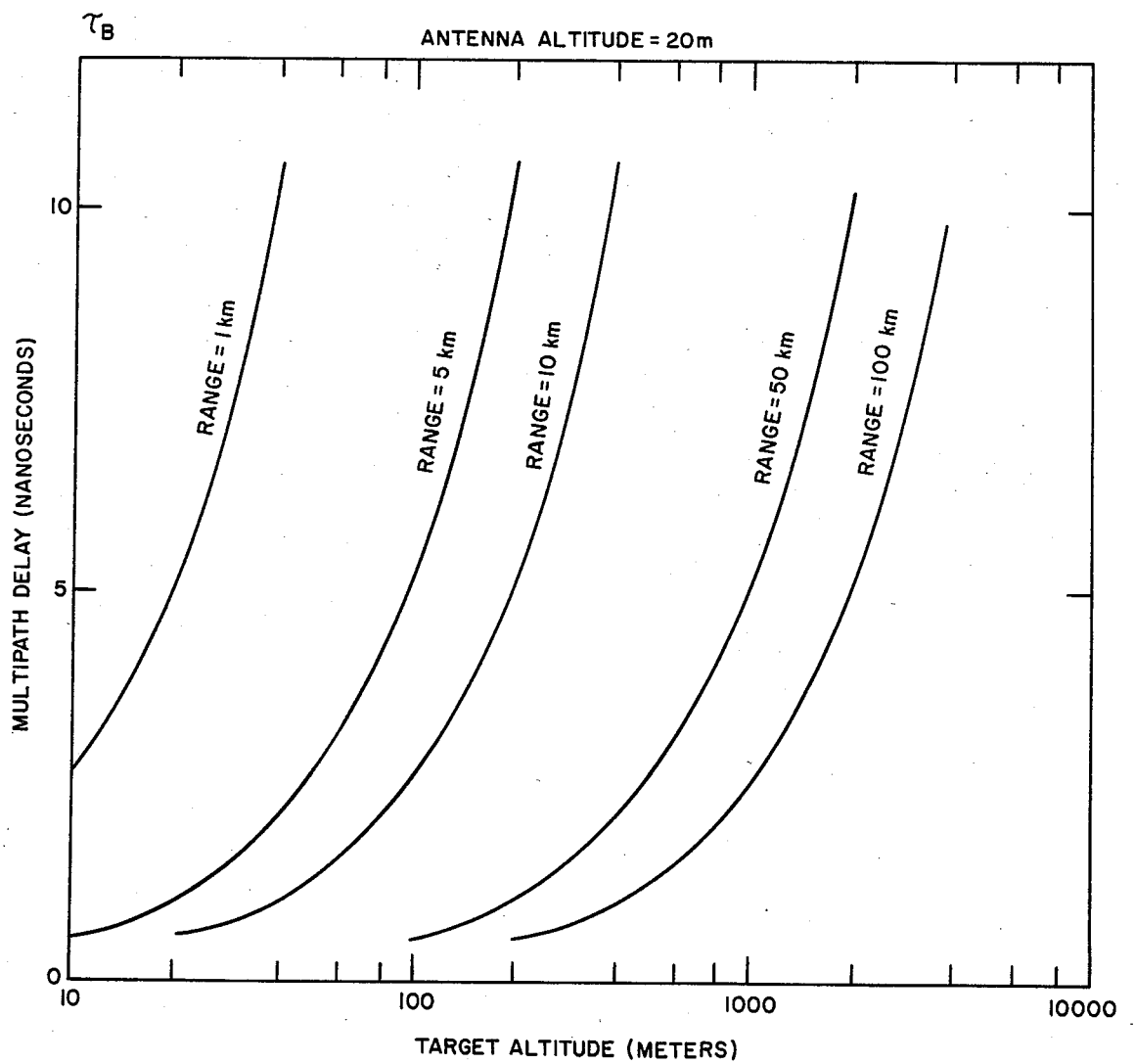
FIG. 6 is a graphical representation of multipath delays for an operational system. The vertical axis is the multipath delay in nanoseconds, the horizontal axis is the target altitude in meters and a family of curves is given for different target ranges in kilometers.

The multipath delays to be expected with this invention are shown in graphical representation in FIG. 5 for a radar having an antenna at 20m above the reflecting surface. The multipath delay is plotted on vertical axis in nanoseconds for target altitudes in meters on the horizontal axis. Five curves are given for target ranges between 1 and 100 km. It is thus seen that target altitudes can be determined for this configuration if multipath delays can be measured in the 1 to 10 nanosecond regime.

The use of the invention has been described in conjunction with multipath reflections from sea water. However the invention can advantageously be used in land applications in the following manner. The radar transmitting and receiving antenna are set above generally level ground at an altitude greater than a few meters. The ground surrounding the radar in the directions in which the radar will operate is covered with a radar reflecting mesh to a distance covering all possible multipath reflections. This distance over which mesh is required is determined by the radar altitude, the target range and target altitude as shown in FIG. 1.

A height-determining radar built according to the invention derives the target altitude without needing to resolve the multipath signal in range. Furthermore the height determination does not rely on a precise measurement of absolute target range. As is evident from Eqn. (3), a 5% accuracy in target range degrades the accuracy of the height determination by no more than 5%. Even though the target return duration must be precisely measured, only a relatively short time interval need be instrumented. The instrumented time interval corresponds to a few range resolution cells or to a range extent slightly greater than that of expected targets. Furthermore since the duration measurement triggers on the target signal itself, pulse-to-pulse changes in target range can be tolerated.

Obviously, numerous modifications and varations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A height-determining radar, comprising a radar transmitter having a transmission site located at an altitude e above a reflecting surface, for emitting pulses of radiation;

a radar receiver having a reception site in proximity to said transmission site for detecting said pulses of radiation reflected from a target located at an altitude h above said reflecting surface;

means for measuring the pulse width variation $\tau_B$ from pulse to pulse of said received pulses of radiation;

means for measuring the range R between said radar receiver reception site and said target; and means for calculating h from the relationship between $\tau_B$, R, e and h $$h = cR\ \tau_B/4e$$

wherein c is the speed of light.

2. A height-determining radar, as recited in claim 1, wherein said means for measuring $\tau_B$ comprises an edge-triggered pulse duration circuit for measuring the pulse width of said received pulses of radiation and means for comparing said measured pulse widths from pulse to pulse for said pulse width variation $\tau_B$.

3. A height-determining radar, comprising:

a radar transmitter having a transmission site located at an altitude e above a reflecting surface, for emitting pulses of radiation including means for varying the linear polarization of said emitted pulses from pulse to pulse;

a radar receiver having a reception site coincident with said transmission site for detecting said pulses of radiation reflected from a target located at an altitude h above said reflecting surface;

means for measuring the pulse width variation $\tau_B$ from pulse to pulse including an edge-triggered pulse duration circuit for comparing said pulse width variations;

means for measuring the range R between said radar reception site and said target; and means for calculating said target altitude h from the relationship $$h = cR\ \tau_b/4e$$

wherein c is the speed of light.

4. A height-determining radar, as recited in claim 3, wherein said pulse width variation $\tau_B$ is the magnitude of the difference of the pulse width between pulses of radiation having orthogonal linear polarizations.

5. A height-determining radar, comprising:

a radar transmitter having a transmission site located at an altitude e above a reflecting surface, for emitting pulses of radiation, including means for varying the linear polarization of said emitted radiation from pulse to pulse;

a radar receiver having a reception site coincident with said transmission site for detecting said pulses of radiation reflected from a target located at an altitude h above said reflecting surface;

an edge-triggered pulse duration circuit for measuring the pulse width of said received pulses;

means for determining the pulse width variation $\tau_B$ of said measured pulse widths from pulse to pulse;

means for measuring the range R between said radar receiver reception site and said target; and means for calculating said altitude h from the equation $$h = cR\, \tau_B/4e$$

wherein c is the speed of light, and generating a signal representative thereof.

6. A height-determining radar, as recited in claim 5, wherein the difference of the pulse widths is the difference between the widths of pulses of different polarizations.

7. A height determining radar, as recited in claim 6, wherein said pulse width variation $\tau_B$ is limited to the magnitude of the maximum difference between the pulse widths of any of said received pulses.

8. A methdd for determining the altitude of a target, comprising the steps of:

emitting a series of radar pulses from a transmission site located at an altitude e above a reflecting surface;

detecting said series of radar pulses reflected from a target located at an altitude h above said reflecting surface at a reception site in proximity to said transmission site;

measuring the pulse widths of said received radar pulses;

measuring the pulse width variation $\tau_B$ of said measured pulse widths; and calculating said altitude h from the equation $$h = cR\, \tau_B/4e$$

wherein c is the speed of light and generating a signal representative thereof.

9. A method for determining the altitude of a target, comprising:

transmitting a series of radar pulses of substantially different linear polarizations from a transmission site located at an altitude e above a reflecting surface;

detecting said series of radar pulses reflected from a target located at an altitude h above said reflecting surface at a reception site coincident with said transmission site;

measuring the pulse widths of said received radar pulses;

measuring the pulse width variation $\tau_B$ of said pulse widths;

measuring the range R of said target from said transmitting site; and calculating said altitude h from the equation $$h = cR\, \tau_B/4e$$

wherein c is the speed of light and generating a signal representative thereof.

10. A method for measuring the altitude of a target, as recited in claim 9, wherein said step of measuring said pulse width variation $\tau_B$ comprises the step of comparing the pulse width of said radar pulses transmitted with substantially different linear polarizations.

* * * * *